UNITED STATES PATENT OFFICE.

CHARLES MOÏSE JACOB, OF PARIS, FRANCE.

IMPROVEMENT IN SEALING BOTTLES, JARS, &c.

Specification forming part of Letters Patent No. 182,760, dated October 3, 1876; application filed September 16, 1876.

*To all whom it may concern:*

Be it known that I, CHARLES MOÏSE JACOB, of Paris, in the Republic of France, have invented certain Improvements in the Sealing of Wine, Liquor, Preserve, and other Bottles and Jars, of which the following is a specification:

This invention has for its object improvements in the sealing of wine, liquor, preserve, and other bottles and jars.

For this purpose I apply silicates of soda or potassa, combined cold, with finely-divided substances, such as lime, magnesia, talc, kaolin, alumina, carbonate of lime, oxide of zinc, and other metallic oxides, employed either together or separately, so as to form a solid compound suitable for being employed as an hermetical seal, to replace the wax or tar, which now used for bottles, jars, or vessels, and particularly for those containing gaseous or sparkling liquids. This method of sealing insures the contents against waste by the porosity of the cork or other stopper by preventing the escape of liquids, or solid substances, of gas or aromas, and protects it against changes of temperature.

The composition which I obtain by the aid of the silicates of soda and potassa, with one or other of the above-mentioned substances, are of a soft consistency when first prepared, so that they adhere to any object dipped into them just in the same way as the wax or tar now used for sealing bottles, except that the application of my composition has, among other advantages, those of cleanness, solidity, infusibility, and adherence, and is employed cold, so that the inconvenience of a fire is got rid of.

When I wish to make the composition I take silicate of soda or potassa, by preference, of 25° to 30° Baumé. I gradually pour the substance finely sifted into a flask, and very intimately mix it cold, either with lime, talc, magnesia, or other of the above-mentioned substances, according to the nature and degree of hardness of the object to be treated, until I obtain a soft cake, having the required qualities. This having been done I dip the object to be sealed into the cake, and then withdraw it into an atmosphere charged with carbonic acid, which, coming into contact with the elements of the cake, at once hardens it.

When it is not desired to obtain a rapid drying the carbonic acid of an airy place is sufficient, and in a few hours the composition is solidified and forms a glaze, which adheres to the object, and takes its form.

Frequently, after drying, the object remains of a dead color, in which case I rapidly submit it (covered with the dried composition) to the action of silicate of soda or potassa, and on withdrawing it will have a brilliant appearance, and the varnish will dry in a short time.

If desired coloring matter may be added to the composition.

What I claim is—

1. The method of sealing bottles, jars, &c., by covering their cocks or mouths with a composition of silicate of soda or potassa mixed with finely-divided lime, talc, magnesia, or similar substance, substantially as set forth.

2. The method of glazing the sealing after it is applied by subjecting it to the action of carbonic acid.

CHARLES MOÏSE JACOB.

Witnesses:
M. TANNIESS,
VILLETTE.